United States Patent [19]
Kinoshita et al.

[11] 4,288,478
[45] Sep. 8, 1981

[54] PARISON AND METHOD FOR FORMING PARISONS FOR BIAXIAL ORIENTATION BLOW MOLDING

[75] Inventors: Harumi Kinoshita, Tokyo; Yoshiaki Hayashi, Matsudo; Tadao Saito, Tokyo, all of Japan

[73] Assignee: Yoshino Kogyosho Co., Ltd., Japan

[21] Appl. No.: 76,769

[22] Filed: Sep. 18, 1979

[30] Foreign Application Priority Data

Nov. 14, 1977 [JP] Japan .................. 52-136427
Nov. 14, 1977 [JP] Japan .................. 52-136430

[51] Int. Cl.³ .................. B65D 1/00; B29C 17/07; B29D 23/02
[52] U.S. Cl. .................. 428/35; 215/1 C; 264/503; 264/312; 428/36; 428/542; 428/910
[58] Field of Search .............. 264/503, 312, 537, 538; 428/35, 36, 542, 910; 215/1 C; 425/525, 533

[56] References Cited
U.S. PATENT DOCUMENTS

3,288,898 11/1966 West ...................... 264/503
3,307,726 3/1967 Cleereman et al. ........ 264/312 X
3,949,033 4/1976 Uhlig ....................... 264/312 X
4,122,138 10/1978 Cleereman et al. ........ 264/312 X

*Primary Examiner*—Jan H. Silbaugh
*Attorney, Agent, or Firm*—Fidelman, Wolffe & Waldron

[57] ABSTRACT

Bottles made of saturated polyester resin, particularly polyethylene terephthalate resin, by orientation blow molding exhibit phenomenal properties and characteristics, but suffer from a serious disadvantage in that the bottle neck is greatly inferior in the properties and characteristics to the bottle body, because the neck is molded into the final form without undergoing biaxial orientation. Biaxial orientation gives the bottle body outstanding properties and performance because it causes the molecules of a molding resin material to be arranged in the same direction. Based on this principle, the bottle neck is given the same effect as is produced with biaxial orientation by applying tensile force in a certain direction to the molecules of a molding resin material while it is still in a temperature range at which orientation takes place.

4 Claims, 12 Drawing Figures

PARISON AND METHOD FOR FORMING PARISONS FOR BIAXIAL ORIENTATION BLOW MOLDING

The present invention relates to a method and apparatus for forming parisons for bottles to be made of polyethylene terephthalate resin by biaxial orientation blow molding.

Bottles made of saturated polyester resin, particularly polyethylene terephthalate resin (to which the following description is confined), have outstanding properties and durability, which are given only by orientation blow molding. In order to accomplish orientation effectively in blow molding of a polyethylene terephthalate bottle, a parison which is a bottomed hollow tube is preformed by injection molding, and subsequently the parison is formed into a bottle by orientation blow molding.

In orientation blow molding, the parison to be formed into a bottle is held by the blow mold at its neck portion during stretching process. Therefore, the neck does not undergo orientation although the body is stretched completely. Due to the lack of orientation in the neck, conventional polyethylene terephthalate bottles have a serious disadvantage in that the neck is inferior in physical properties and durability to the body.

For instance, conventional bottles, when filled with alcohol of high concentrations, betray their weakness that the neck gets frosted by the infiltrating alcohol and suffers many fine cracks, losing its mechanical strength and sealing effect to a great extent.

This invention has been completed in order to overcome such weakness. According to the present invention, the resin material constituting the neck of a bottle is subjected to molecular orientation by applying a rotary force in a relatively opposite direction to the internal and external peripheries of the neck portion of the parison when the parison is injection molded or before the injection-molded parison is formed into a bottle by orientation blow molding. Orientation for the neck is performed while the neck is in a certain temperature range suitable for effective orientation before it cools to solidify.

A primary object of this invention, therefore, is to provide a method and apparatus for making polyethylene terephthalate bottles by biaxial orientation blow molding, having the neck which exhibits as outstanding properties and durability as the body of the bottle.

Another object of the invention is to provide a method and apparatus for providing increased friction resistance between the internal periphery of the neck and the member to apply a rotary force to the internal periphery of the neck, so that a sufficient relative rotation takes place between the internal and external peripheries of the neck of the parison which is still in a certain temperature range for effective orientation.

Other objects and advantages of the present invention will become apparent from the following description taken in conjunction with the accompanying drawings, wherein:

FIGS. 2 and 3 are diagrammatic illustrations embodying the invention.

FIGS. 9 to 12 show another embodiment of this invention;

The invention will be described into detail referring to the accompanying drawings.

According to this invention, molecules of a resin material that forms the neck 2 of a bottle are orientated by applying a rotary force in a relatively opposite direction to the internal periphery 23 and the external periphery 24 of the neck around the axis of the neck 2, when the parison 1 is injection molded or the injection-molded parison 1 is formed into a bottle by biaxial orientation blow molding, while the neck 2 is still in a certain temperature range suitable for effective orientation.

Figure 1:
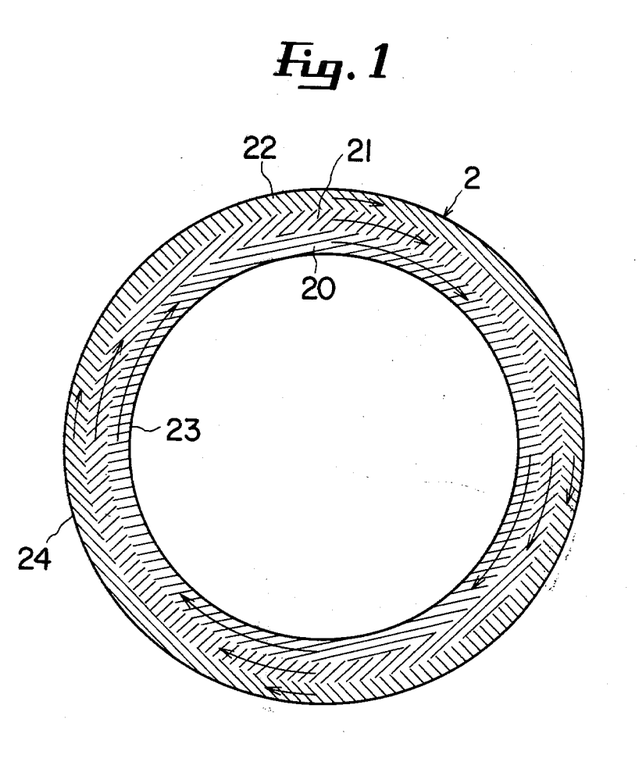
FIG. 1 is an enlarged sectional top view to illustrate the basic principle of this invention.

As will be apparent from FIG. 1 showing an enlarged sectional top view of the neck 2, the resin material forming the neck 2 will be forcibly moved in the direction of the arrow if a rotary force is applied to the internal periphery 23 of the neck 2, with the external periphery 24 held stationary, while the resin material still has a certain degree of fluidity in a proper temperature range for effective orientation.

Since the external periphery of the neck 2 is held stationary and the resin material is in a viscous state, the resin material 20 near the internal periphery 23 is moved most, and the resin material 21 between the internal periphery 23 and the external periphery 24 is moved half as much as the resin material 20, and the resin material 22 near the external periphery 24 is moved very little.

The difference in movement of the resin materials 20, 21, and 22 at different positions exerts tensile force in the same direction (coinciding with the rotating direction) on the molecules of the resin material, causing orientation along the direction of the tensile force.

According to this invention, the parison 1 is formed by applying a rotary force in a relatively opposite direction to the internal periphery 23 and the external periphery 24 of the neck 2 of the parison 1. A variety of means are conceived to apply a relative rotary force to the internal periphery 23 and the external periphery 24 of the neck 2.

In one means as mentioned above, the rotary force may be applied to the internal periphery 23, with the external periphery 24 held stationary. In another means, the rotary force may be applied to the external periphery 24, with the internal periphery 23 held stationary.

The object intended in the method of this invention is accomplished equally irrespective of whether the rotary force is applied to the internal periphery 23 or the external periphery 24. However, applying the rotary force to the external periphery 24 causes inconvenience to forming screw threads on the external periphery, which is often the case with bottles fitted with screw caps. In addition, in order to hold the external periphery 24 in uniform contact with its entire surface while the neck 2 is still soft at a temperature for effective orientation, a split mold should be employed as a matter of course.

Thus, it is extremely disadvantageous from mechanical point of view to apply the rotary force to the external periphery 24 through a mold or holding fixture which is in contact with the external periphery 24.

In contrast to this, it is advantageous to apply the rotary force to the internal periphery 23 because usually it has a smooth surface and it is in contact with a core rod.

Therefore, the embodiment of this invention is concerned with a construction that permits the rotary force to be applied to the internal periphery 23.

Figure 2:
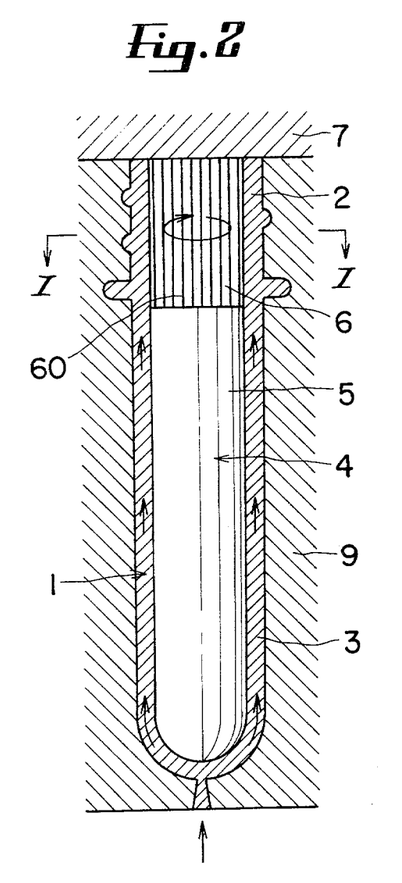
FIG. 2 is a vertical section and FIG. 3 is a detail sectional top view taken in the direction of the arrow along the line I—I of FIG. 2.
Figure 3:
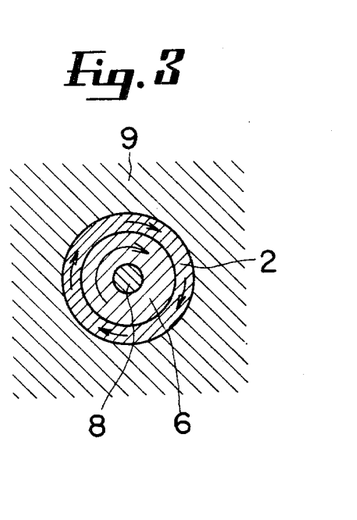

The embodiment shown in FIGS. 2 and 3 is one in which the rotary force is applied to the internal periphery 23 of the neck 2 simultaneously when the parison 1 is injection molded. FIGS. 4 to 12 illustrate another embodiment in which the rotary force is applied to the internal periphery 23 of the neck 2 before the parison 1 preformed by injection molding is formed into a bottle by biaxial orientation blow molding.

In the embodiment shown in FIGS. 2 and 3, the core 4 which in conjunction with the cavity 9 forms a space or mold cavity for molding the parison 1, is contructed such that the base part 6 of the core 4 which corresponds to the neck 2 of the parison 1 is rotated around the axis of the core 4.

The base part 6 may be made rotatable by various means. In the embodiment shown in FIG. 3, the core plate 7 is provided with a spindle 8 that connects the core 5 to the core plate 7, and the base part 6 is rotatably mounted to this spindle 8 so that the base part 6 can be rotated on the core plate 7 by a proper drive means.

In this case, care should be taken so that no gaps are formed between the core 5 and the base part 6 and between the base part 6 and the core plate 7.

The molding space or mold cavity formed by clamping the core 4 and the cavity 9 of above-mentioned structure is filled with molten polyethylene terephthalate resin by injection molding, and simultaneously the base part 6 is rotated in one direction while the injected resin is still in a molten state.

It goes without saying that the molten resin should be in a certain range of temperature at which effective orientation is established.

The unidirectional rotary motion of the base part 6 causes the molten resin forming the neck 2 of the parison 1 to be dragged by the base part 6 and to flow in the rotary direction of the base part 6.

The molten resin injected into the molding space or mold cavity solidifies slowly as cooled by the cavity 9 and the core 4, and the rotary force causes the molten resin at the neck 2 to flow against the resistance of increasing viscosity. Thus, the resin material at the neck 2 is subjected to orientation in the circumferential direction.

The rotary motion of the base part 6 is stopped when the resin material forming the parison 1 is cooled below the temperature at which no orientation is effected, and thereafter the parison 1 is demolded when it has cooled and solidified.

As mentioned above, according to this invention, the same effect as is obtained by orientation molding is imparted to the neck 2 by rotating the base part 6 in one direction so that the molten resin material forming the neck 2 is forcibly flowed together with the base part 6. It is desirable that the molten resin be caused to flow certainly in the circumferential direction by the rotary motion of the base part 6. Therefore, it is also desirable that there be a great friction resistance in the circumferential direction between the periphery of the base part 6 and the molten resin material or the internal periphery 23. In order to provide a sufficient friction resistance, the base part 6 is preferably provided with a multiplicity of grooves 60 on its periphery.

If the friction resistance between the base part 6 and the resin material is insufficient, slipping will occur between them because there is an increasing attractive force between the molecules of the resin material is half solidified in a temperature range at which orientation is effected. If such slipping should occur, it becomes impossible to cause the resin material to flow forcibly. This situation is likely to arise because the cooling of the resin material proceeds from the surface in contact with the cavity 9 and the core 4 toward the internal part.

The object intended in the method of this invention is certainly accomplished by providing a multiplicity of fine longitudinal grooves 60 on the periphery of the base part 6 so that the friction resistance between the base part 6 and the resin material is increased, and thereby the resin material is caused to flow certainly when it is cooled and half-solidified at a temperature at which orientation is effected.

In the embodiment shown in FIGS. 2 and 3, the orientation of the neck 2 is accomplished at the same time when the parison 1 is injection molded. The time in which the resin material forming the neck 2 is in a temperature range for effective orientation is limited as a matter of course, because the molten resin injected into the molding space or mold cavity formed by the cavity 9 and the core 4 is subjected to continuous cooling from the cavity 9 and the core 4.

The time in which the resin material forming the neck 2 is in a temperature range for effective orientation is predictable because it is determined by the temperature of the molten resin to be injected, the cooling temperature, and the size and wall thickness of the parison 1 to be formed.

Thus, if the base part 6 is driven in synchronism with the above-mentioned time interval, the orientation of the neck 2 will be accomplished as the parison 1 is injection molded.

In another embodiment shown in FIGS. 4 to 12, the orientation of the neck 2 is accomplished by reheating the neck 2 to the orientation temperature before the injection-molded parison 1 is formed into a bottle by biaxial orientation blow molding.

The embodiment shown in FIGS. 4 to 8 is different from the embodiment shown in FIGS. 9 to 12 only in the construction of the rotary core 10 that exerts tensile force to the neck 2.

In the embodiment shown in FIGS. 4 to 12, the neck 2 of the injection molded parison 1 in a bottomed cylindrical shape is heated to a temperature at which orientation takes place. The parison 1 is held stationary by the holding mold 17 on the entire surface of the external periphery 24 of the neck 2. Then, into the neck 2 of the thus held parison 1 is inserted the rotating member 11 which fits snugly to the neck 2 so that there is no slipping in the circumferential direction of the internal periphery 23 of the neck 2. The rotating member 11 is kept turning until the neck 2 is cooled below a temperature at which orientation takes place.

The rotary core 10 having the rotating member 11 as a main part is not restricted in the construction so far as it holds the rotating member 11, permitting it to rotate around the axis of the parison 1. Provision should be made so that the resin material does not leak when the neck 2 is subjected to rotary motion by the rotating member 11.

The embodiment shown in the drawings has the following structure. The holding mold 17 holds the parison 1. The base plate 15 is movable up and down along the axis of the parison 1. To the underside of the base plate 15 is attached the spindle 16 in alignment with the axis of the parison 1. The rotating member 11 which fits snugly to the inside of the neck 2 is rotatably mounted on the spindle 16. At the lower end of the spindle 16 is fixed the core end 14 having an outside diameter equal to the inside diameter of the parison 1.

The base plate 15 has a smooth lower side that comes in intimate contact with the upper side of the holding mold 17 which holds the parison 1 stationary in such a manner that the upper side of the holding mold 17 coincides with the upper end of the parison 1.

The core end 14 of the core 10 is a relatively low cylinder having an outside diameter equal to the inside diameter of the parison 1, and is provided with a conical end that facilitates the insertion into the parison 1. The core end 14 prevents the resin material from being forced out to the body part from the adjacent neck 2 when the resin material is subjected to rotary movement by the rotating member 11. Therefore, the core end 14 has a periphery of desired height and width which comes in contact with the inside of the parison 1.

Needless to say, the above-mentioned action of the core end 14 is not accomplished by the core end 14 alone, but is accomplished in combination with the holding mold 17.

It will be understood, therefore, that the holding mold 17 should be in uniform contact with the external surface of that part of the parison 1 opposite to the neck 2 of the parison 1 and the peripheral surface of the core end 14.

The rotating member 11 which rotates to cause orientation to the neck 2 has the following structure. A cylindrical body having a height equal to the length of the neck 2 and having an outside diameter equal to the inside diameter of the neck 2 is rotatably mounted on the spindle 16 which is in alignment with the axis of the cylindrical body. The cylindrical body thus mounted on the spindle 16 is provided with a plurality (eight in the embodiment shown in FIG. 3) of longitudinally raised engaging portions 12 along the entire length of the periphery of the cylindrical body.

Figure 4:
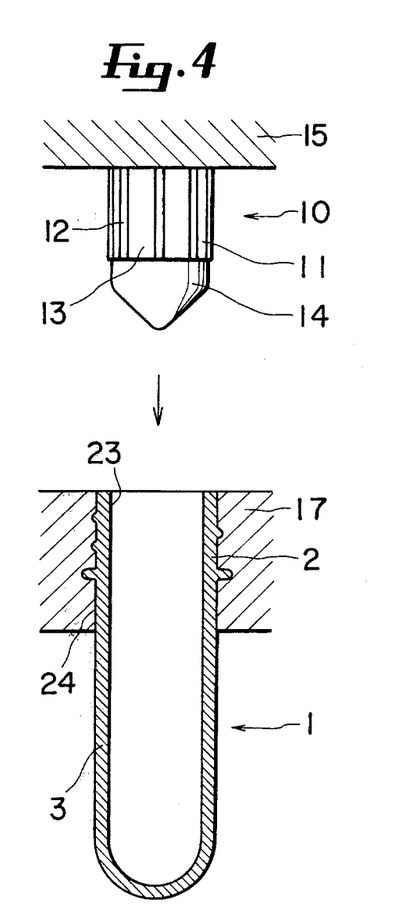
FIG. 4 is an elevation, partly in section, showing another embodiment of this invention.
Figure 5:
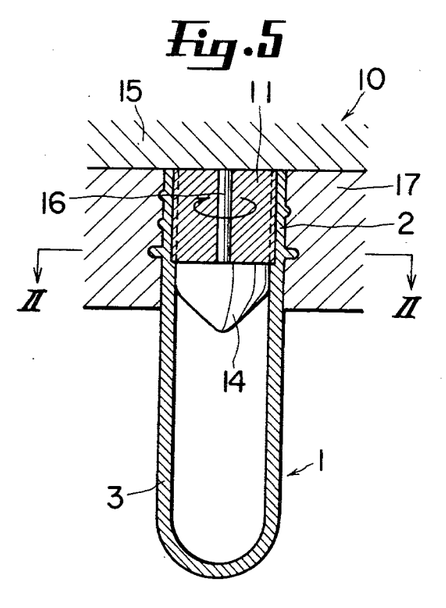
FIG. 5 is a vertical section showing the embodiment of FIG. 4 in operation.
Figure 6:
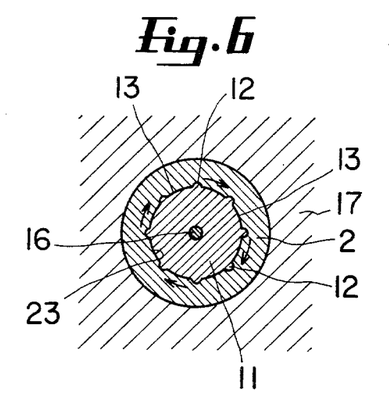
FIG. 6 is a detail sectional top view taken in the direction of the arrow along the line II—II of FIG. 5.

In the embodiment shown in FIGS. 4 to 6, the internal periphery 23 of the neck 2 is a completely smooth surface. If an attempt is made to insert the rotating member 11 into the neck 2, the resin material displaced by the raised portions 12 has to be relieved. Otherwise, a trouble will occur.

For the purpose of relieving the resin material displaced by the raised portions 12, the longitudinal recess parts 13 are formed adjacent to respective raised portions 12 in the embodiment shown in FIGS. 4 to 6. This makes the rotating member 11 relatively complex in structure.

If the longitudinal engaging grooves 25 which snugly fit to the longitudinally raised portions 12 are formed previously on the inside of the neck 2, it is not necessary to form the recess parts 13 on the rotating member 11. All needed is to form the longitudinally raised portions 12 alone.

In either cases, extremely high friction resistance arises along the circumferential direction between the rotating member 11 and the inside of the neck 2 when the rotating member 11 is inserted into the neck 2.

Needless to say, the rotating member 11 is driven by a proper drive means (not shown) around the axis of the spindle 16.

It is a matter of course that provision is made to keep extremely close the mating surfaces of the rotating member 11 and the core end 14 and the mating surfaces of the rotating member 11 and the base plate 15, so that the resin material does not enter the space between the mating surfaces.

In the embodiment shown in FIGS. 9 to 12, the rotary body 10 is so designed as to be inserted easily into the neck 2. The engaging pieces 12' are formed separately from the rotating member 11, and are so constructed as to be projected as much as desired outward from the periphery of the rotating member 11.

The rotating member 11 is formed into a cylindrical shape just a little smaller in diameter than the inside diameter of the neck 2. The rotating member 11 is then provided with several longitudinal slits on its circumferential surface along almost the entire length. The engaging pieces 12' are slidably fitted to the slits in the radial direction of the rotating member 11. The engaging pieces 12' are positioned by a proper spring means (not shown) so that the outward end is retracted inward from the external periphery of the rotating member 11.

The cylindrical rotating member 11 with several (four in the embodiment shown) engaging pieces 12' fitted thereto is provided therein with the cylindrical member 18 which is moved up and down. When the cylindrical member 18 is moved to its lower limit at which it faces the engaging pieces 12', it forces the engaging pieces 12' out against the spring force. When the cylindrical member 18 is moved to its upper limit at which it does not face the engaging pieces 12', the engaging pieces 12' are restored by the spring force.

Figure 7:
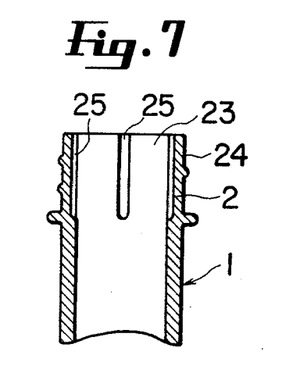
FIG. 7 is a vertical section showing the neck of a parison formed by the embodiment as shown in FIGS. 4 and 5.
Figure 8:
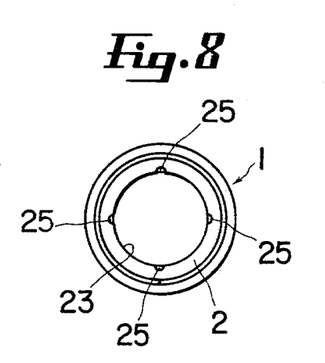
FIG. 8 is a top view showing the neck of a parison formed by the embodiment as shown in FIGS. 4 and 5.
Figure 9:
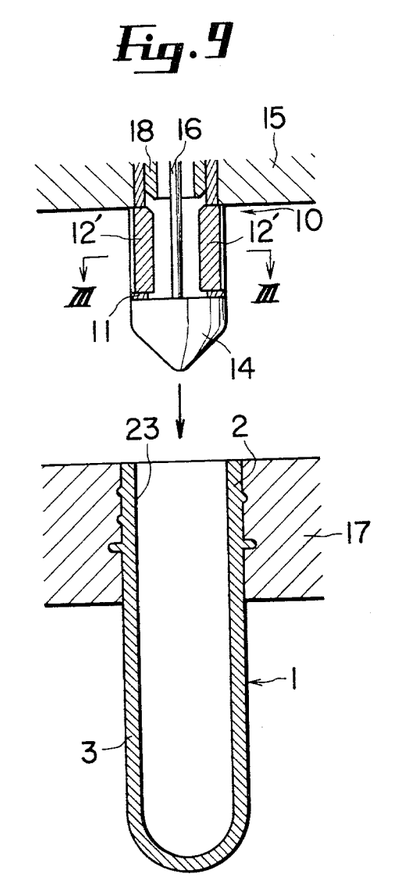
FIG. 9 is a vertical section of core rod and parison not in engagement with each other.
Figure 10:
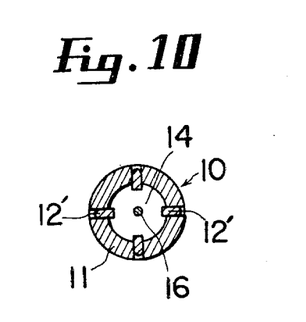
FIG. 10 is a top view, partly in section, taken in the direction of the arrow along the line III—III of FIG. 9.
Figure 11:
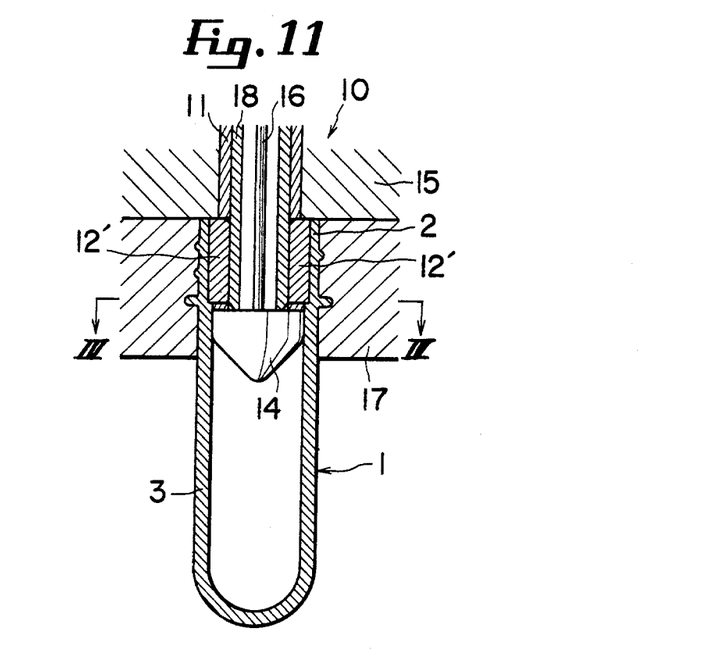
FIG. 11 is a vertical section showing the embodiment of FIG. 11 in operation.
Figure 12:
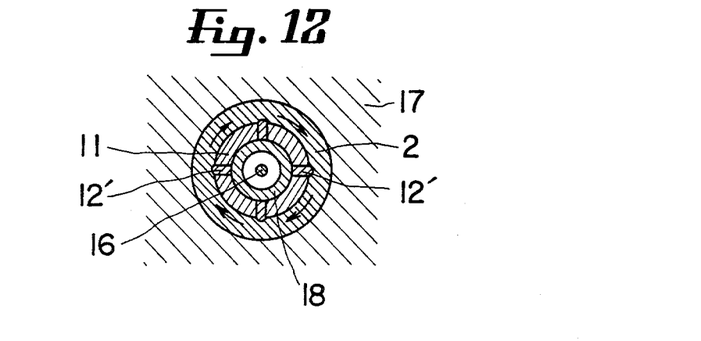
FIG. 12 is a detail sectional top view taken in the direction of the arrow along the line IV—IV of FIG. 11.

In the embodiment shown in FIGS. 9 to 12, unlike the embodiment shown in FIGS. 4 to 6, the neck 2 is not deformed when the rotary core 10 is inserted into the neck 2, and consequently it is not necessary to make the core complex in structure as shown in FIGS. 7 and 8.

The rotary core 10 having the above-mentioned structure works as follows: The parison 1 with at least the neck 2 heated to an orientation temperature is held stationary by the holding mold 17. The rotary core 10 is moved downward along the axis of the parison 1, so that the rotating member 11 and core end 14 are inserted into the neck 2.

When the base plate 15 has come into intimate contact with the upper surface of the holding mold 17, with the rotary core 10 inserted completely, the rotating member 11 is turned in one direction by a proper drive means.

The rotary motion of the rotating member 11 causes the raised portions 12 or the engaging pieces 12' to move the half-molten resin material forming the neck 2.

The forced flow against the intermolecular attraction of the resin material forming the neck 2 gives rise to orientation in the neck 2.

The neck 2 is subjected to flow and orientation by turning the rotating member 11, and the rotary motion of the rotating member 11 is stopped before the neck 2 is cooled below the orientation temperature, and then the parison is cooled.

In the embodiments shown in FIGS. 4 to 12, the injection molding of the parison 1 and the biaxial orientation blow molding of the bottle are carried out in the completely independent processes. Therefore, the present invention can be practiced using the existing molding equipment.

Since it is possible to predict the time in which the resin material forming the neck 2 remains in a temperature range at which orientation is effected, it is possible to control the driving of the rotating member 11 automatically with a timer. This will easily permit the automation of the orientation process for the neck 2.

As mentioned above, this invention provides a method and apparatus for making polyethylene terephthalate bottles by biaxial orientation blow molding, having the neck 2 which exhibits as outstanding properties and durability as the body 3. Thus, according to this invention, polyethylene terephthalate bottles with improved properties and durability can be produced easily by simple operation. In addition, since it is possible to predict the cooling rate of the resin material forming the neck 2, the orientation process of the neck 2 can be controlled automatically with a timer. This will help reduce greatly the number of processes required for practicing the present invention.

An apparatus for orientation of the neck 2 may be easily constructed by modifying an existing injection molding machine for the parison 1 so that the base part 6 of the core 4 is made rotatable. A simple apparatus for orientation of the neck 2 may be provided separately from an existing injection molding machine and blow molding machine. Thus, the present invention will be practiced easily by inexpensive facilities with many good effects.

What is claimed is:

1. In a process for making injection-molded parison preforms for biaxial orientation blow molding of saturated polyester resin bottles, said preform having a body portion, a neck portion and a central axis, and said neck portion having an internal periphery and an external periphery, comprising forming a mold cavity for injection molding said preform, injecting molten resin into said mold cavity, and allowing said molten resin to solidify to form said preform, an improvement which comprises utilizing a mold cavity defined by an outer mold, a central core and a core plate, said central core having a rotatable base adjacent to the internal periphery of the neck portion of said preform and a stationary core extension adjacent to said body portion, said base being rotatable independent of said core extension, and applying a rotary force in one direction around the central axis of the preform, said force exerted only on the internal periphery of the neck portion of the preform by rotation of said rotatable base after said molten resin is injected into said mold cavity and while the injected resin is still at a temperature at which orientation is effected.

2. The process of claim 1, wherein the resin is polyethylene terephthalate resin.

3. A product of the process of claim 1.

4. A product of the process of claim 2.

* * * * *